US012264761B2

(12) United States Patent  (10) Patent No.: US 12,264,761 B2
Barten et al.  (45) Date of Patent: *Apr. 1, 2025

(54) LINE GUIDING DEVICE FOR HANGING APPLICATIONS, PARTICULARLY AS A SERVICE LOOP FOR A DRILLING RIG

(71) Applicant: IGUS GMBH, Cologne (DE)

(72) Inventors: Dominik Barten, Meckenheim (DE); Harald Nehring, Bonn (DE)

(73) Assignee: IGUS GMBH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,785

(22) Filed: Sep. 1, 2023

(65) Prior Publication Data

US 2023/0407993 A1  Dec. 21, 2023

Related U.S. Application Data

(63) Continuation of application No. 17/254,095, filed as application No. PCT/EP2019/066109 on Jun. 18, 2019, now Pat. No. 11,774,006.

(30) Foreign Application Priority Data

Jun. 18, 2018 (DE) ...................... 20 2018 103 418.9

(51) Int. Cl.
 *E21B 17/20* (2006.01)
 *F16L 3/015* (2006.01)
 (Continued)

(52) U.S. Cl.
 CPC .............. *F16L 3/015* (2013.01); *E21B 17/20* (2013.01); *H02G 3/0475* (2013.01); *H02G 11/00* (2013.01)

(58) Field of Classification Search
 CPC .......... E21B 17/20; F16L 3/015; H02G 3/0475
 See application file for complete search history.

(56) References Cited

U.S. PATENT DOCUMENTS 4,840,023 A * 6/1989 Borsani .................. F16G 13/10
 248/51
5,771,676 A  6/1998 Komiya et al.
 (Continued)

FOREIGN PATENT DOCUMENTS

CN  1594915  3/2005
CN  1784816  6/2006
 (Continued)

OTHER PUBLICATIONS

International Search Report from corresponding PCT Appln. No. PCT/EP2019/066109 dated Aug. 26, 2019.
 (Continued)

*Primary Examiner* — Matthew R Buck
(74) *Attorney, Agent, or Firm* — Grossman, Tucker, Perreault & Pfleger, PLLC (57) ABSTRACT

A line routing device for guiding a plurality of lines, such as cables, hoses, or the like, particularly for hanging applications, such as supplying a vertically traveling power head of a drill. The line routing device has a flexible carrying strand and a plurality of guide bodies arranged one behind the other in the longitudinal direction of the carrying strand. According to the invention, adjacent guide bodies can be deflected spatially toward each other and each guide body has a central part having a center axis, which extends coaxially to the carrying strand, and an outer part having at least one circumferential element. The outer part delimits a receiving region, which is open in the axial direction, for the lines, radially to the outside.

28 Claims, 3 Drawing Sheets

(51) Int. Cl.
*H02G 3/04* (2006.01)
*H02G 11/00* (2006.01)

(56) References Cited

U.S. PATENT DOCUMENTS

| | | | | |
|---|---|---|---|---|
| 5,900,586 | A * | 5/1999 | Carr | H02G 3/0493 174/95 |
| 7,278,253 | B2 * | 10/2007 | Wehler | H02G 11/00 248/51 |
| 7,966,724 | B2 | 6/2011 | Dodwell et al. | |
| 8,389,901 | B1 | 3/2013 | Gelmetti et al. | |
| 9,435,398 | B2 | 9/2016 | Hermey et al. | |
| 9,449,737 | B2 | 9/2016 | Little et al. | |
| 10,290,394 | B2 | 5/2019 | Tetsuka et al. | |
| 11,774,006 | B2 * | 10/2023 | Barten | E21B 17/20 166/75.11 |
| 2005/0056333 | A1 | 3/2005 | Utaki | |
| 2006/0260833 | A1 | 11/2006 | Blase et al. | |
| 2010/0275570 | A1 | 11/2010 | Hermey et al. | |
| 2016/0040803 | A1 | 2/2016 | Steeger | |

FOREIGN PATENT DOCUMENTS

| | | | |
|---|---|---|---|
| CN | 102449866 | 5/2012 | |
| CN | 105144514 | 12/2015 | |
| CN | 105313141 | 2/2016 | |
| CN | 108075414 B * | 11/2020 | ............. F16G 13/16 |
| DE | 69607101 | 11/2000 | |
| DE | 102010032920 | 2/2012 | |
| DE | 202012001760 | 5/2012 | |
| DE | 102013000905 A1 * | 7/2014 | ............. F16G 13/16 |
| DE | 102014107232 | 11/2015 | |
| DE | 112016002597 | 5/2018 | |
| DE | 102018208828 A1 * | 12/2019 | ............. F16G 13/16 |
| EP | 2105575 | 9/2009 | |
| EP | 2986869 | 8/2017 | |
| JP | 46-9957 | 4/1971 | |
| JP | 7-504757 | 5/1995 | |
| JP | 2005-522753 | 7/2005 | |
| JP | 2008-129491 | 6/2008 | |
| JP | 2010-266519 | 11/2010 | |
| WO | 2012/013496 | 2/2012 | |
| WO | WO-2013124370 A2 * | 8/2013 | ........... H02G 3/0475 |
| WO | WO-2016207132 A1 * | 12/2016 | ............. F16G 13/16 |
| WO | 2017/195148 | 11/2017 | |

OTHER PUBLICATIONS

International Preliminary Report on Patentability from corresponding PCT Appln. No. PCT/EP2019/066109 dated Dec. 24, 2020.
English translation of Search Report from related Chinese Appln. No. 201980047821.1, dated Mar. 21, 2022.
Office Action from related Indian Appln. No. 202037055690, dated Sep. 16, 2022.
Office Action from related Brazilian Appln. No. BR112020025464-9, dated Jan. 9, 2023.
Office Action from related Japanese Appln. No. 2020-570485, dated May 9, 2023. English translation attached.
Office Action from related Canadian Appln. No. 3, 104, 194, dated Jan. 22, 2024.
Office Action from related Malaysian Appln. No. PI 2020006790, dated Sep. 28, 2023.
Office Action from related Japanese Appln. No. 2023-173485, dated Dec. 24, 2024. English translation attached.

* cited by examiner

LINE GUIDING DEVICE FOR HANGING APPLICATIONS, PARTICULARLY AS A SERVICE LOOP FOR A DRILLING RIG

CROSS-REFERENCE TO RELATED APPLICATIONS

The present application is a continuation of U.S. non-provisional application Ser. No. 17/254,095 filed Dec. 18, 2020, currently pending, which is a U.S. national stage (371) application of PCT application serial no. PCT/EP2019/066109 filed Jun. 18, 2019, which claims priority to German patent application serial no. 20 2018 103 418.9, filed Jun. 18, 2018, which are all incorporated by reference herein.

FIELD

The invention generally concerns an apparatus for routing a plurality of supply lines like for example cables, hoses or the like, hereinafter referred to as a line routing apparatus, in particular for hanging applications, in which the line routing apparatus is arranged with two hanging portions and a loop therebetween.

BACKGROUND

The invention concerns in particular but not exclusively a line routing apparatus which is suitable as a so-called "service loop", for example for a drilling rig. Service loops are line bundles which are used for supplying a generally vertically moveable consumer, for example the rotary power head, referred to as the top drive, of a drilling rig and form a loop between two freely hanging portions to afford freedom of movement.

Figure 4:
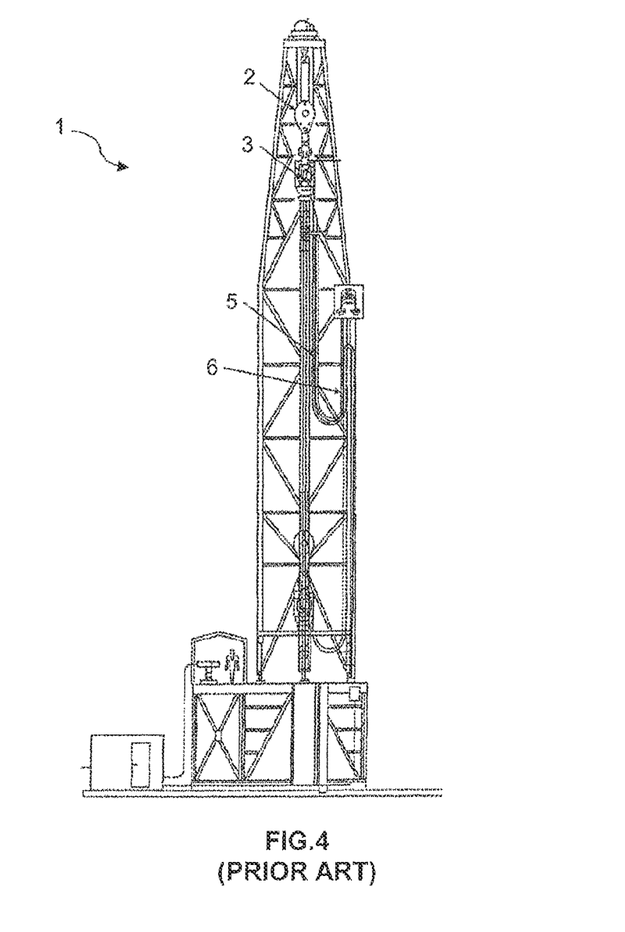
FIG. 4 shows as an example of application of the invention a drilling rig with a top drive which is supplied with a per se known service loop (state of the art) to be replaced by the line routing apparatus.

Such a service loop is described for example in EP 2105575 B1 and is shown in attached FIG. 4 (state of the art) with reference numeral 6 as part of a derrick 1. In that arrangement hoses 5 and cables supply the top drive 3 with energy electrically, hydraulically and/or pneumatically and possibly also transmit measurement and control signals by way of electrical and/or optical lines (not shown). The top drive 3 is supplied by the service loop 6 and displaced vertically with a lifting device 2. EP 2105575 B1, for developing a service loop, proposes a structurally complicated device which is intended to prevent the supply lines becoming entangled with each other when the top drive 3 moves up and down.

In conventional service loops a plurality of lines are carried in a condition of being combined by a reinforced rubber hose of large diameter. Typically, the hose is then filled with casting material as described for example in U.S. Pat. No. 7,966,724 B2 in order to support the lines against the inside of the outer hose. That structure makes subsequent repair and maintenance, like for example replacement of a line, considerably more difficult. In order to reduce the downtime, the entire hose assembly with all lines is replaced, even if for example only one line is defective. Another disadvantage, in particular in drilling rigs, is the relatively large minimum radius of the loop caused inter alia by the large outside diameter.

As a further development U.S. Pat. No. 9,449,737 B2 proposes a structure of smaller diameter. Proposed therein is a special inner plastic casing as well as a particular shielding, which both have a high load-carrying capacity in order to be able to avoid having the load-bearing outer hose.

In contrast EP 2986869 B1 discloses a different kind of line routing apparatus which is suitable in particular for supplying a drilling head in offshore drilling rigs. That line routing apparatus has two flexible load strands of high tensile strength, which extend over the length of the line routing apparatus and to which a multiplicity of routing bodies are fixed, arranged in succession in the longitudinal direction of the load strands. That chain-like line routing apparatus is suitable for very high tensile forces, for example hanging uses of up to 200 meters in length as in deep drilling equipment or the like and is inter alia salt water-resistant. The configuration disclosed in EP 2986869 B1 permits very great lengths and affords good protection, that is to say a long service life for the lines, in particular when being winched up and down, but is less suitable for use as a service loop, inter alia because of the structural space required which for example is generally not available in the interior in the derrick.

SUMMARY

In comparison with the foregoing state of the art a first object of the invention is to design a line routing apparatus in such a way that the finished manufacture including assembly with the desired lines is simplified, in particular even in the case of a long overall length. In addition, the invention seeks to provide that the new line routing apparatus affords good protection, avoids entanglement of a plurality of lines and nonetheless is of a compact and comparatively light structure.

According to a further aspect, subsequent maintenance operations, in particular the replacement of individual lines, is to be facilitated. Furthermore, in comparison with conventional service loops a smaller minimum radius in the direction-changing region or the loop between two longitudinal portions is desirable.

The proposed line routing apparatus has a flexible carrying strand of high tensile strength, which extends over the length of the line routing apparatus and a number of guide bodies are arranged in succession or consecutively along the longitudinal direction of the apparatus.

According to a core concept of the invention, to attain the first object, it is proposed that adjacent guide bodies can be respectively deflected spatially relative to each other (that is to say they are respectively pivotable relative to each other about at least two axes) and each guide body includes a central part having a central axis which extends coaxially with respect to the carrying strand and an outer part with at least one peripheral element. In that case the peripheral element is held to the central part and radially outwardly delimits a receiving region which is open in the axial direction for one or more lines or appropriately defines said receiving region. Preferably but not necessarily each central part can be provided with an axial through opening which forms a central axis and through which the carrying strand extends.

The carrying strand carries a substantial part of the weight and relieves the load of tensile forces on the lines, similarly to the internal core of a cable. The carrying strand is so flexible that it does not adversely affect deflection of the guide bodies relative to each other. The guide bodies hold the lines in the receiving region, that is to say relative to the central part, and thus fixedly at least in the radial direction relative to the carrying strand. This avoids entanglement and the need for a load-bearing outer hose. By suitable dimensioning of the outer part the lines are held relatively play-free, which would require casting material in known service loops. With a suitable configuration the guide bodies also permit the replacement of individual lines.

Tensile stress relief for the lines is mostly advantageous. For that purpose, for example respective end tensile strain relief means of a suitable structure, for example so-called tensile strain relief socks, can be provided on both sides of the line routing apparatus, possibly without tensile strain relief in respect of the lines within the line routing apparatus. Alternatively, or in addition tensile strain relief means can also be provided within the line routing apparatus at a number of locations in its longitudinal direction, this however reduces the mobility of the lines. For tensile strain relief within the line routing apparatus for example the peripheral elements at the respective locations can be fixedly tied together and held in tensile strain-resistant fashion at the respective central part or carrying strand.

The invention affords particular advantages where relatively heavy line bundles have to be arranged hanging substantially vertically over a considerable length. The present invention is therefore particularly suitable for use in a land or onshore or sea or offshore drilling rig, in particular as a service loop, but is not restricted to those areas. Further applications of offshore operations are for example supply cables (umbilicals) between the platform and the supply ship or onshore power supply for ships. The solution of the invention is also particularly well suited for land-based applications, in particular hanging applications, for example in drilling or deep drilling systems or in mining.

According to first aspects of the invention it can be provided that in each guide body the outer part can be opened and/or it can be provided that at least some guide bodies, in particular all guide bodies, respectively have at their central part a fixing device for fixing the central part in position to the carrying strand at least in the axial direction, in particular in force-locking relationship and/or positively locking relationship.

Openable outer parts can be provided in particular by at least one peripheral element being respectively connected moveably or pivotably to the central part. Alternatively or in addition, at least one peripheral element can be fitted releasably from the guide body, for example by a screw connection, a plug-in connection or the like, preferably by a dropsafe fastening.

Particularly in the case of drilling rigs like land or onshore or sea or offshore drilling rigs basically all releasable elements of a guide body should be dropsafe, in particular secured to the guide body at least doubly secured, for example by screwing with pin securing or similar secure screwing structures. Accordingly, the central parts are each fixed in position, preferably in dropsafe fashion, at any event to the carrying strand in the axial direction so that in the event of breakage of the carrying strand the guide bodies cannot drop down. Openable outer parts, for example with pivotable peripheral elements, permit lateral access to the receiving region and thus facilitate manufacture and maintenance as lines can be laterally inserted and removed, that is to say they do not have to be "threaded in" or passed through in the axial direction, as for example into the carrying hose of conventional service loops. The peripheral elements can be for example flexible or can be pivoted open by a distinct hinge. In that case fixing to the carrying strand fixes the position in the axial direction, wherein that is possibly required only in portion-wise manner, for example if the guide bodies bear axially against each other. In that arrangement pivotable peripheral elements can be in particular captively held to the guide body so that subsequent maintenance is simplified and parts are reliably prevented from dropping off.

In a further aspect of the invention, it can be provided that at least some and in particular all guide bodies at their at least one peripheral element have on the outside an elastic buffer for shock absorption, in particular in relation to the radial shocks. The buffer preferably extends in the peripheral direction around the central axis, preferably over the entire periphery. The buffers damp lateral impact of the guide bodies in a horizontal swinging movement caused by the vertical movement occurring in operation. In addition, the buffers can at the same time also act as an angular abutment between the individual guide bodies in order to limit the relative deflection thereof relative to each other with a damping action. Thus, with a good protective effect in spite of being of a simple structure this at the same time permits the loop to be of a small radius. The radius can be selected to be of virtually any value by dimensioning of the peripheral elements and buffers on the one hand and the axial spacing between successive peripheral elements on the other hand, but should not be below the smallest permissible minimum radius of the lines.

The number or plurality of guide bodies is so selected that they are provided along by far the predominant length of the carrying strand, but the ends thereof are exposed. The guide bodies can follow each other in particular directly or without spaces therebetween, or however they can be arranged with intermediate spaces. The guide bodies are preferably not braced relative to each other but are fixed to the carrying strand without prestressing or with play for moving around. In a preferred embodiment the central part as its fixing device has a clamping and/or locking device in order to secure the carrying strand in force-locking relationship at an internal surface of the through opening in the central part. That allows inter alia simplified manufacture.

In principle all suitable approaches can be considered as the fixing device, which do not adversely stress the carrying strand.

Particularly if each central part is provided with an axial through opening through which the carrying strand extends the arrangement can have for example a screw clamping device with a clamping screw. That can be in particular in the form of a clamping clip, in particular a hinged clamping clip with a hinge-like joint. In that case there are preferably two shell-shaped regions on the central part. They can be connected by the hinge so that a clamping screw is required only at one side. With a clamping screw which is opposite to the hinge and which can brace the shell-shaped regions relative to each other then in that way secure fixing can be effected similarly as in the case of a clamping clip.

Alternatively, it is also possible to provide a quick-release clamp, a latching clamp or similar device which at least partially reduces the free diameter of the through opening or fixes, for example clamps fast, the central part to the carrying strand, in force-locking and/or positively locking relationship.

Other kinds of fixing the guide bodies in position are also in accordance with the invention. In a further embodiment the carrying strand can be in the form of a link chain, for example a round link chain, wherein each central part forms a kind of special chain link as a load-bearing component of the carrying strand. In that arrangement, for reducing the weight in relation to length, preferably two respective successive central parts can be spatially deflectably connected by one or more actual chain links which are provided as intermediate members (without the outer part). The intermediate members can then be for example conventional metal links of a round link chain which are linked together with oppositely disposed holding eyes of the central parts.

In a further embodiment the carrying strand can be in the form of a "pearl necklace" with carrying bodies which have a fixed or stationary position seen in the longitudinal direction of the carrying strand and to which the central parts are fixed in force-locking relationship by means of a suitable respective fixing device.

Irrespective of the kind of fixing adopted the central parts are preferably secured fixedly and non-rotatably, in particular in torsion-resistant fashion, to the carrying strand. That can be achieved particularly easily by positively locking clamping to the carrying strand.

In the state of being ready for operation the outer part preferably forms a delimitation which is closed in the peripheral direction or which extends completely around the central axis of the guide body so that all lines are held securely in the plane perpendicular to the carrying strand in the respective receiving region. In a preferred development the outer part of each guide body has two peripheral elements which are respectively connected to the central part moveably or pivotably by way of a rotary joint, a hinge joint, a hinge band or the like, in order to insert the lines into and remove them from the receiving region. The peripheral elements however can also be adapted to be opened in a different fashion, for example can be removable. The latter is considered in particular when a service loop in the event of line damage is replaced completely or as a packet with all lines and line replacement does not have to take place on the rig.

The peripheral elements are preferably in the form of half a ring. In addition, the peripheral elements can preferably be identical parts, that is to say both identical, to reduce the number of parts.

All of or the essential components of the central part and the outer part, in particular the peripheral elements, can be made from plastic, in particular as injection mouldings.

The elastic buffer is preferably made from an elastomer, for example from a synthetic rubber or the like, and for example can be in the form of a rubber buffer. The buffer is more elastic than the other components of the guide body. Preferably the buffer is of a ring-shaped or toroidal configuration. The buffer should embrace the predominant part of the periphery. Particularly preferably the buffer surrounds the peripheral element or elements over the full periphery, for example in the form of a closed or closable ring. The buffer can at the same time represent securing or closure of the moveable peripheral element or elements and for example can serve as a holding ring which can be axially pushed on. The buffer can also be in the form of a cut-open ring which is closed together with the peripheral elements.

Preferably all guide bodies have a buffer, wherein each buffer preferably projects axially with respect to the peripheral element or elements or lies axially flush with respect thereto so that the buffers of adjacent guide bodies butt against each other in order to limit the maximum angle of the spatial deflection of those guide bodies relative to each other acting as abutments. Wear is reduced by buffers as the deflection limiting arrangement and inter alia the generation of noise is reduced. The buffers can be held for example by each peripheral element at its outside having a holding groove which extends in the peripheral direction and into which the ring-shaped buffer engages in positively locking relationship to provide the axial holding action or vice-versa.

In a preferred embodiment the carrying strand has at both ends a respective connecting device for releasably fixing the line routing apparatus to the installation to be supplied, for example to the drilling rig. That facilitates replacement of the line routing apparatus. When using a cable as the carrying strand all current cable end connectors or cable end connection devices can be considered, like for example spliced or pressed eyes, pressed or spliced thimbles, pressed clamps or cast thread fittings or the like and so forth. In the case of a link chain as the carrying strand all current releasable end connections can also be considered, like shackles, hooks, screw connections, clamps, eyes and so forth.

Particularly preferably provided at each connecting device is a fixing device for tensile strain relief on the lines, in particular by means of so-called cable strain relief socks (referred to as meshed cable supporting grips), preferably with a loop/thimble or holding eye. For that purpose each connecting device is preferably provided with at least two horizontally opposite holding arms which are fixed to the connecting device in load-carrying relationship and to which the guided lines can be fixed for tensile strain relief, for example by means of shackles which each releasably hold a meshed cable supporting grip. By virtue of such a configuration complete replacement of the line routing apparatus including the lines is simplified as it is only necessary to release the two connecting devices.

The outer part can have precisely one peripheral element with a large periphery, in particular >300° angular extent. Preferably the outer part however is of a multi-part configuration with a plurality of peripheral elements. In cross-section the outer part can define an approximately circular shape, that is to say the peripheral elements can preferably be in the shape of a circular arc, wherein the outer part can be designed in particular with two respective semi-circular elements. Other shapes, for example a polygonal cross-section, are also possible.

The outer part should preferably provide a sufficient inside diameter or diameter for the receiving region for receiving appropriate lines. The diameter of the receiving region should be perceptibly greater than 100 mm, in particular at least 125 mm, in order to be able to guide supply lines in the intended applications.

In an embodiment the central part can have two hinge regions which project axially relative to the peripheral elements and which are in axially opposite relationship. In that arrangement the hing regions are of a conjugate configuration so that the one hinge region of a first guide body can be releasably introduced in the axial direction into the conjugate other hinge region of an adjacent second guide body, that is to say the guide bodies can be fitted axially together. The axially releasable configuration of the hinge regions considerably simplifies assembly as the guide bodies only have to be fitted to the carrying strand or the carrying strand only has to be passed through the central parts and they can then be "plugged" one into the other. Accordingly such an optional hinged connection of successive guide bodies is preferably loose in the axial direction, but at least can be released or plugged in easily axially.

Implementing tensile strength in the optional hinge connection between the guide bodies, in particular the adjacent hinge regions, is in principle not required by virtue of of the carrying strand in hanging applications. In a preferred development the hinge regions can form a ball hinge-like hinge connection for spatial deflection of adjacent guide bodies. It is possible to achieve a push-in hinge connection with a part-spherical hinge head and an approximately hemispherical hinge socket and/or with a hinge head/socket which can be axially fitted together by expansion of the socket and/or squashing of the head. In another embodiment the guide bodies are fixed to the carrying strand in axially mutually spaced relationship by means of their fixing devices, which reduces the amount of material involved and the weight.

The through opening in the central part can preferably have mutually opposite axial mouth regions which widen radially outwardly to reduce wear of the central part and/or the carrying strand.

In a particularly preferred embodiment the central part of each guide body has two one-part carrying arms which each have an inner clamping shell and a radial bar. In that arrangement the clamping shells can be connected together to form therebetween the through opening for the carrying strand, in particular as a clamping device. The central part can substantially comprise those two carrying arms. The bars of the carrying arms preferably have an outer end region to which the outer part, in particular both peripheral elements, is or are connected. The bars thus hold the peripheral element or elements and thereby secure the lines (radially) to the carrying strand, to which the clamping shells are fixed. The or each peripheral element can possibly be integrally connected to the bars and for example can be flexibly pivoted open. Preferably each peripheral element as a separate part is connected to the bars by way of a hinge.

In addition at its inside atn the through opening the central part can have a clamping tooth arrangement extending transversely relative to the central axis, for axial securing to the carrying strand.

The carrying strand can be in particular a carrying cable which has good tensile strength, for example of high-strength plastic. In the present case tensile strength means that the carrying strand or the caring cable has sufficient tensile strength to carry the total weight of the line routing apparatus including all lines, that is to say a notional end weight which corresponds to the total weight of the line routing apparatus with all lines. The required static load-carrying capability of the carrying strand is dependent on the application involved, but should typically be >>1000 kg.

A wire cable with individual cable wires is also considered as the carrying strand, preferably with a nominal strength of the wire material of >900 N/mm2. In addition or alternatively to cable wires of plastic cable wires of steel can also be considered, possibly with a core of plastic. The carrying strand or the carrying cable should be as low-stretch as possible. As an alternative to a carrying cable for example it is also possible to use a link chain, for example comprising steel links, as the carrying strand.

Preferably however a carrying cable of high-strength plastic is used in conjunction with guide bodies which are at least predominantly made from plastic. In that way it is possible to achieve a comparatively low weight in relation to length of <40 kg/m for the line routing apparatus per se (without guided lines) even with a comparatively great receiving capacity in respect of the guide bodies or a large inside diameter, for example >>200 mm, and a corresponding load-carrying force. The noise emission level is also markedly lower in comparison with link chains.

For intended applications, in particular in drilling rigs, the carrying strand is preferably of a length of at least 5 m, in particular at least 10 m. In that case the carrying strand is preferably completely continuous and has a higher level of tearing strength and tensile strength than the guided lines.

In hanging applications the line routing apparatus has in particular a first length portion which hangs down and which has a first end connected to a consumer, a second length portion which hangs down and which has a second end connected to a supplying installation/machine component, and a loop connecting the two downwardly hanging length portions. In that arrangement the downwardly hanging length portions extend in a first approximation virtually vertically in a first region starting from the ends, strictly speaking mathematically, or, depending on the respective horizontal spacing of the ends, along a cable curve or chain curve, that is to say a catenoid (referred to as a catenary) which corresponds to the function of the hyperbolic cosine (or cos h).

The carrying strand or the carrying cable extends in that case beyond both ends, that is to say it extends over the desired total length of the line routing apparatus and projects at the end beyond the guide bodies in order to facilitate weight-carrying fixing of the carrying strand or carrying cable.

As an independent aspect of the invention an individual guide body for a line routing apparatus according to one of the foregoing embodiments is also claimed.

According to a core concept the guide body has a central part having an axial through opening which forms a central axis and through which a carrying strand can be passed, and an outer part having at least one peripheral element. The peripheral element delimits a receiving region which is open in the axial direction for the lines outwardly and for that purpose is held to the central part.

According to an aspect of the invention the peripheral element is connected to the central part in such a way that it is moveable or can be pivoted open.

According to another aspect of the invention provided on the central part is a fixing device for fixing the central part in position to a carrying strand.

According to a further aspect according to the invention provided on the peripheral element at the outside thereof is an elastic buffer for shock absorption, for damping in particular in relation to radial shocks and/or acting as an abutment for the guide bodies against each other.

Advantageously the guide body can have one or more of the further features described hereinbefore as advantageous in any combination with one of the foregoing aspects.

The invention also concerns a drilling rig having a top drive including a hangingly arranged line routing apparatus according to one of the foregoing embodiments for supplying the top drive.

The line routing apparatus is suitable in particular for use in a land or offshore drilling rig as a replacement for a conventional service loop, in initial equipment or as a replacement. Depending on the respective demands involved there can additionally be provided a thin flexible protective casing without a carrying function, which however should be so designed that it can be opened.

BRIEF DESCRIPTION OF THE DRAWINGS

Further details, features and advantages of the invention will be apparent from the detailed description hereinafter of preferred embodiments by way of example with reference to the accompanying drawings. In the drawings.

DETAILED DESCRIPTION

Figure 1A:
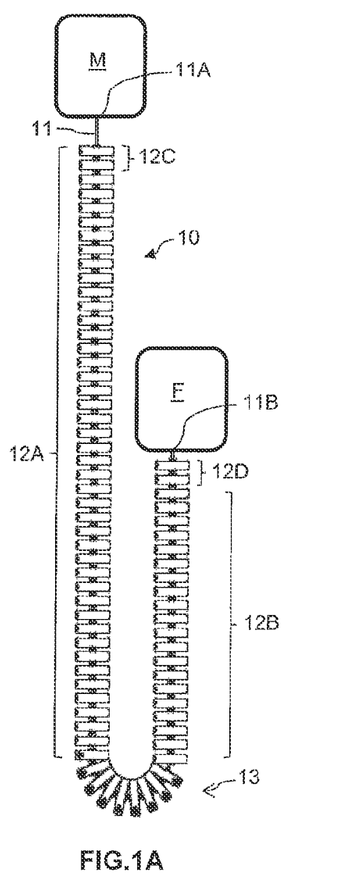
FIGS. 1A-1B show a first embodiment of a line routing device in a hanging arrangement for supplying a vertically moveable consumer as a side view (FIG. 1A) and a perspective enlarged view of the lower region or the direction-changing loop (FIG. 1B)
Figure 1B:
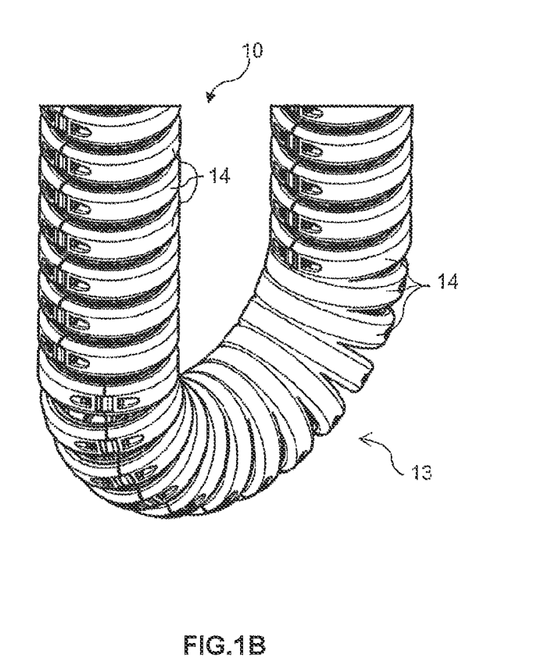

FIGS. 1A-1B show a first example of a line routing apparatus 10 according to the invention in a hanging arrangement with a first vertical longitudinal portion 12A which has a first end 12C, and a second vertical length portion 12B having a second end 12D. The first end 12C is connected to a machine component M which in this example travels vertically up and down, for example a top drive 3 (see FIG. 4) of a derrick. The second length portion 12B in turn is fixed with its end 12D to a frame structure or stationary machine part F. A loop 13 forms a direction-changing region which connects the two substantially vertically hanging length portions 12A, 12B.

The line routing apparatus 10 has a flexible carrying cable 11 of high-strength plastic fibres, for example of high-modulus polyethylene or high-modulus polyamide, which as the carrying strand carries the weight load of the line routing apparatus 10. For that purpose, the free end regions 11A, 11B, which project at both sides, of the carrying cable 11 is suitably fixed to the moveable machine part M and the stationary machine part F (diagrammatically shown in FIG. 1A). As a second essential component the line routing apparatus 10 has a plurality of annularly closed guide bodies 14 which occur in succession in the longitudinal direction of the carrying strand 11 (FIG. 1B). The guide bodies 14 are arranged in a row on the carrying cable 11 and are carried and held thereby. The carrying cable 11 thereby carries at least the entire weight of all guide bodies 14.

As FIG. 1B shows the loop 13 between the length portions 12A, 12B forms a relatively small radius, that is to say the length portions 12A, 12B can extend at a slight horizontal spacing relative to each other. The small radius is possible inter alia by virtue of the fact that adjacent guide bodies 14 can be strongly angled relative to each other. The guide bodies 14 are each moveable spatially relative to each other, as shown in FIG. 1B. The spacing between the length portions 12A, 12B however can also be markedly greater depending on the respective application and they do not have to hang down vertically. Depending on the respective application the line routing apparatus 10 can for example also extend similarly to a hanging bridge.

Figure 2A:
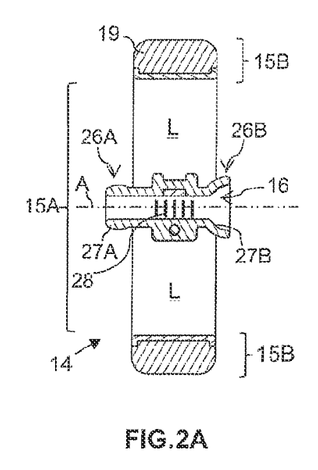
FIGS. 2A-2C show an axial section/longitudinal section (FIG. 2A) and a radial section/cross-section (FIG. 2B) and a perspective view (FIG. 2C) of a guide body of the line routing apparatus of FIGS. 1A-1B.
Figure 2B:
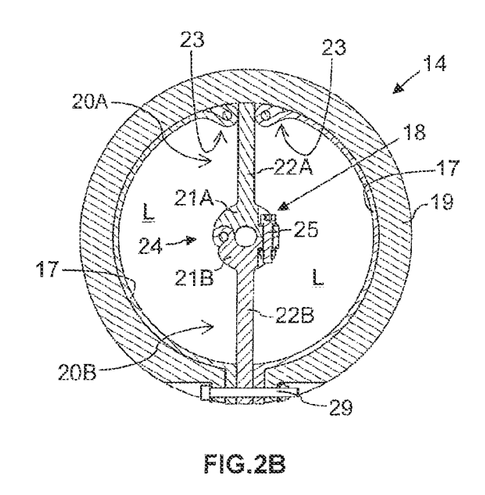

FIGS. 2A-2B show a first embodiment of a guide body 14 for the line routing apparatus 10. Each guide body 14 has inwardly a central part 15A having a central axis A and a through opening 16 coaxial therewith in order to pass the carrying strand 11 (FIG. 1A) therethrough and externally an outer part 15B having two peripheral elements 17 which are in the shape of a circular arc, here with an arc length of about 160-180°, in order to hold the lines. Each peripheral element 17 radially outwardly delimits a receiving region L which is open in the axial direction for the lines (not shown).

The central part 15 includes a fixing device 18 for fixing the guide body 14 axially in position to the carrying cable 11. In FIGS. 2A-2B this is in the form of a screw clamping device 18 in the manner of a hinged clamping shell or cable clamp. For that purpose, the central part 15A has two one-piece carrying arms 20A, 20B which are integrally produced from plastic and which each have an inner clamping shell 21A, 21B. By virtue of their conjugate configuration the clamping shells 21A, 21B form at one side a hinge-like joint 24 (see FIG. 3) which pivotably connects the clamping shells 21A, 21B. At the opposite side the clamping shells 21A, 21B have screw openings for a clamping screw 25 to brace the U-shaped clamping shells 21A, 21B against each other. Alternatively, quick-release clamping devices or the like can also be considered. The clamping shells 21A, 21B further form centrally two approximately semi cylindrical inside surfaces of the through opening 16. By tightening of the clamping shells 21A, 21B the central part 15A, that is to say the guide body 14, is fixed to the carrying cable 11 for the inside surface of the through opening 16 is fixed in force-locking relationship to the carrying strand 11. A clamping tooth arrangement 28 extending transversely relative to the central axis A is provided at the inside surfaces of the two clamping shells 21A, 21B for giving a better axial securing action.

As FIG. 2B shows each carrying arm 20A, 20B includes integrally with the respective clamping shell 21A, 21B a radial bar 22A, 22B, to the outer end region of which the outer part 15B that is to say the two peripheral elements 17, are connected flexibly, here by a rotary hinge. In that way the two peripheral elements 17 are respectively connected to the one bar 22A of the central part 15A pivotably by way of an associated rotary joint 23, for example a hinge, pivotably between the closed position in FIG. 2B and an open position (not shown). In that way insertion or removal of lines into or from one of the receiving regions L is facilitated. The peripheral elements 17 are here identical parts and are in the form of a half ring, produced for example from plastic parts or metal sheet. The peripheral elements 17 form releasable eyes for the hinge 23, which similarly as in the case of pipe clamps, are rotatably mounted on a mounting pin or spindle on the one bar 22A. At the opposite end the peripheral elements 17 and the other bar 22B have screw openings passing therethrough for a securing screw 29 with a securing nut or the like. In that way the peripheral elements 17 are fixed to the other bar 22B in the closed position (FIG. 2B). The inside diameter of the receiving regions L defined in that way, measured radially between the peripheral elements 17, is in the region of approximately at least 150 mm to 300 mm, or greater. The receiving capacity is predetermined by suitable dimensioning of the peripheral elements 17 and optionally the bars 22A, 22B.

FIG. 2A further shows two central axially projecting hinge regions 26A, 26B of the central part 15A. They serve for a defined low-wear relative movement of adjacent guide bodies 14 without transverse shifts relative to each other out of the extended position in the length portions 12A, 12B into the complete angled position at the apex of the loop 13 (downward in FIG. 1B) and back. For that purpose, each central part 15A has two hinge regions 26A, 26B in opposite relationship at the ends, coaxially with the central axis 16. The opposite hinge regions 26A, 26B are of such a conjugate or paired configuration that the one hinge region 26A can be axially inserted releasably coaxially into the respective conjugate other hinge region 26B of an adjacent hinge body with the application of a slight force or no force, in particular without needing a tool. The hinge regions 26A, 26B can form a ball joint-like hinge connection for spatial deflection of adjacent guide bodies 14 about any two axes. For that purpose, the one hinge region 26A is in the form of a joint head 27A with the outer surface of a ball ring (see FIG. 2C) (part spherical) and the corresponding conjugate hinge region 26B is in the form of a joint socket 27B with an approximately hemispherical inside surface (see FIG. 2A).

Figure 2C:
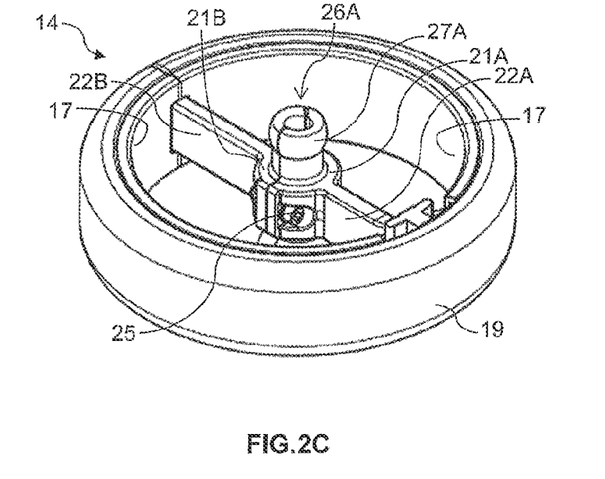

FIGS. 2A-2C further show an annular elastic buffer 19 comprising an elastomer, which surrounds the peripheral elements 17 substantially over the full periphery. The buffer can be rounded in the transition between the axial end and the peripheral surface and serves on the one hand as an angular abutment for limiting the minimum direction-changing radius of the loop 13 (downward in FIG. 1B) and on the other hand for damping radial shocks, for example when impacting against the installation/machine or in transport.

Each buffer 19 is in the form of an open ring with a gap for mounting on the outer part and is closed with the securing screw 29. In the example shown here the buffer 19 does not project axially beyond the peripheral elements 17 but is axially flush with the axial end of the peripheral elements 17, but a projecting configuration is also possible. For axial securing purposes the buffers 19 engage radially into a peripheral holding groove or receiving means at the outside of the peripheral elements 17. It is however also possible to fit peripherally closed buffers 19 (without a gap) in place with a tight fit like a wheel tyre, for example to additionally secure the peripheral elements 17. The elastic shock-absorbing buffers 19 can be solid bodies or, depending on the structural size involved for saving weight, they can be in the form of hollow bodies.

Figure 3:
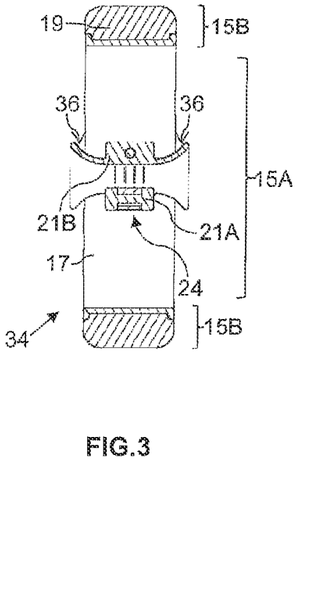
FIG. 3 shows a radial section/cross-section of a second embodiment of a guide body.

FIG. 3 shows a second embodiment of a guide body 34 for a line routing apparatus 10. The guide body 34 differs from that shown in FIGS. 2A-2B in particular in that it does not have any pronounced joint regions 26A, 26B. The guide body 34 is intended for mounting in a row on the carrying cable 11 with an axial spacing between adjacent guide bodies 34. In the guide body 34 shown in FIG. 3 there are mutually opposite trumpet-shaped mirror image-symmetrical mouth regions 36. The mouth regions 36 enlarge radially outwardly or widen in order to reduce frictional wear with the carrying cable 11 when assuming an angled position. Thus, if required it is also possible to achieve a still smaller radius for the loop 13 (FIG. 1B). Otherwise the same references in FIG. 3 denote the same parts as in FIGS. 2A-2C. A greater enlargement of the through opening 16 however can also be provided in FIGS. 2A-2C.

FIG. 4 shows an example of use for the line routing apparatus 10 shown in FIGS. 1-3 in a derrick 1. In this case the line routing apparatus 10 can serve as a replacement for the conventional service loop 6 which supplies the top drive 3.

Figure 5A:
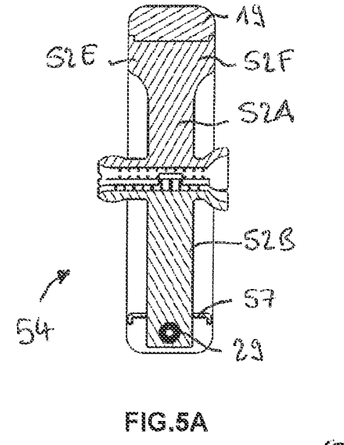
FIGS. 5A-5B show a preferred third embodiment of guide bodies in a modified configuration (FIG. 2A-2C)
Figure 5B:
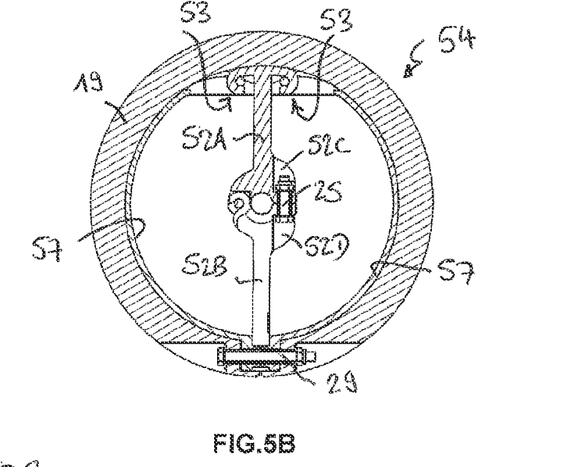

FIGS. 5A-5B show a variant of FIGS. 2A-2C with guide bodies 54. One difference is that the carrying arms have material thickenings 52C, 52D for protecting the lines at both bars 52A, 52B in the region around the clamping screw 25. In addition, the bar 52A at which the rotary joint 53 is provided for pivoting the peripheral elements 57 open forms further material thickenings 52E, 52F for protecting the lines in relation to the rotary joints 53 and for mechanically reinforcing the joints 53. In FIGS. 5A-5B hinge pins are provided at the peripheral elements 57 and are mounted pivotably to the bar 52A. The guide bodies are identical to FIGS. 2A-2C in other essential features. As in FIGS. 2A-2C in particular the central part and also the outer part can be made at least predominantly from plastic injection mouldings.

Figure 6:
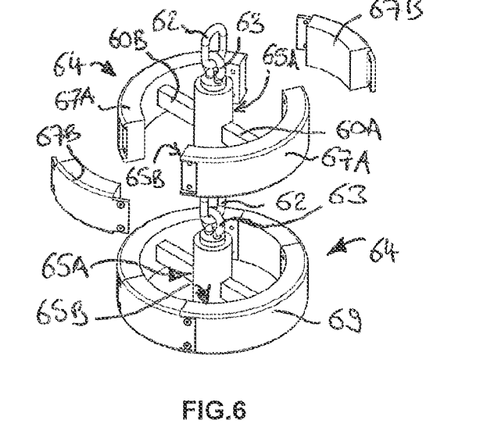
FIG. 6 shows a further embodiment of a line routing apparatus wherein the carrying strand is in the nature of a link chain.

FIG. 6 is a perspective view of a short length portion of an alternative embodiment in which the carrying strand 11 (see FIG. 1A) is not in the form of a carrying cable but is in the form of a link chain. For that purpose the individual guide bodies 64 respectively have in axially opposite relationship two holding eyes 63 with which they can be linked in the longitudinal direction by means of intermediate members 62, for example of the structure of typical chain links of a round link chain, and can be deflected relative to each other. The central parts 65A in FIG. 6 are thus load-bearing integral component parts of the chain-like carrying strand. In this case each central part 65A of each guide body 64 also has two diametrally opposite carrying arms 60A, 60B to which the outer part 65B is fixed. A further difference in relation to FIGS. 2A-2C and FIGS. 5A-5B is that the outer part 65B here has two fixed, non-releasable peripheral elements 67A in the shape of a circular arc, which are produced for example in one piece with the carrying arms 60A, 60B. Two releasable peripheral elements 67B in the shape of a circular arc are removably fixed to the non-releasable peripheral elements 67A of the outer part 65B, for example by a screw connection, as is shown in an exploded view in FIG. 6 in relation to the upper guide body 64.

Figure 7:
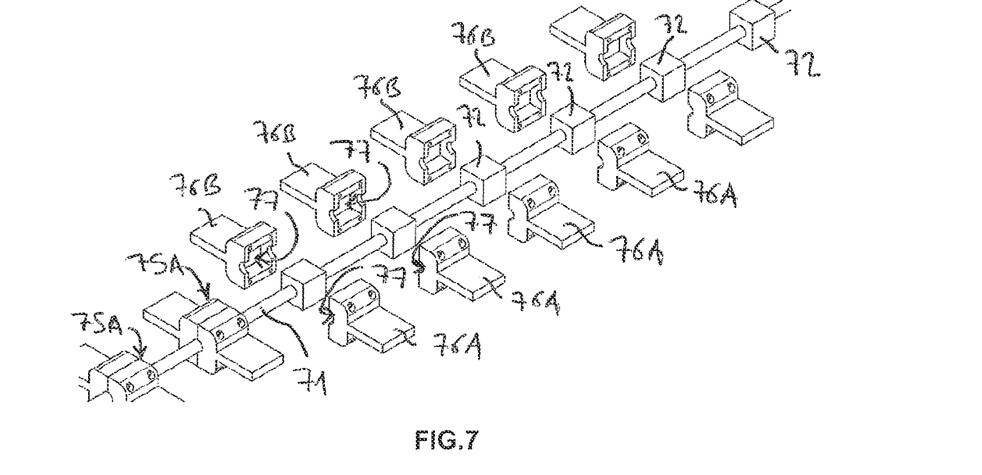
FIG. 7 shows a further embodiment of a line routing apparatus wherein the carrying strand has carrying bodies for positively locking fixing of the guide bodies.

FIG. 7 is a partial perspective view of a longitudinal portion of a further alternative embodiment in which the carrying strand is in the form of a carrying cable 71. Block-like carrying bodies 72 are stationarily fitted to the carrying cable 71 at regular intervals. The carrying bodies 72 can be pressed in position and/or fixed to the carrying cable in the longitudinal direction by adhesive. That structure permis a positively locking connection for the central parts 75A, for securing in position on the carrying cable 71. For that purpose the central parts 75A in FIG. 7 each have receiving means 77 which are respectively formed on the carrying arms 76A, 76B and which are suitably designed for positively locking engagement with the carrying bodies 72. The receiving means 77 are fitted similarly to holding means in positively locking relationship mon the carrying bodies 72 and are fixedly connected together, for example by screwing. The outer parts (not shown in FIG. 7 for the sake of simplicity of the drawing) can in this case be of a structure corresponding to FIG. 5A-5B or also FIG. 6. In the example in FIG. 7 the central parts 75A, in particular the carrying arms 76A, 76B and the receiving means, can also be produced in one piece from plastic in the form of injection mouldings.

Figure 8:
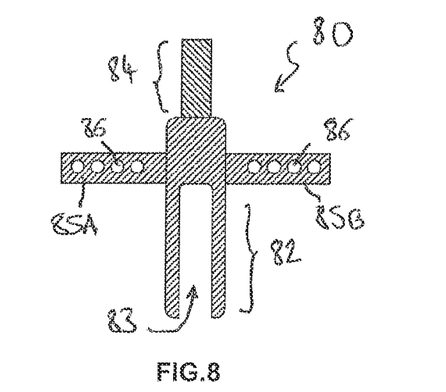
FIG. 8 shows a diagrammatic cross-section through a connecting device for fixing an end of a carrying cable to a cable sleeve and holding arms for tensile strain relief of the lines.
Figure 9:
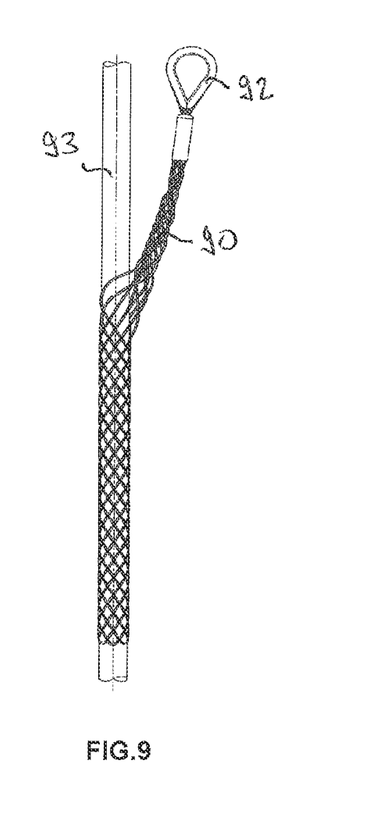
FIG. 9 shows a line with a meshed cable supporting grip for tensile stress relief and fixing to a connecting device, for example as shown in FIG. 8.

FIGS. 8 and 9 show a connecting device 80, with which the end regions 11A, 11B of the carrying cable 11 (FIG. 1) can be releasably fixed to the connecting points of the installation. The connecting device 80 in FIG. 8 includes a main body, for example produced by cutting machine in the form of a metal component, with a cable sleeve in the lower region, which includes a coaxial receiving means 83 in which the respective end region 11A, 11B of the carrying cable 11 (FIG. 1) is received and fixed in tension-resistant fashion by pressing and/or casting with a casting material (adhesive joint). Provided at the opposite end is a threaded projection 84 with a male or female thread, to which preferably a shackle, a load eye, a load hook or the like (not shown) is screwed to permit easy assembly/disassembly. In addition the connecting device 80 includes at least two oppositely disposed radial holding arms 85A, 85B having transverse bores 86 for fixing a respective individual line 93 directly to the connecting device 80 and thus also to the carrying cable 11. By virtue of the bores 86 meshed cable supporting grips 90 (FIG. 9) can be suspended in tensile strain-relieved relationship with a loop/thimble 92 by means of shackles on the holding arms 85A, 85B.

LIST OF REFERENCES

FIGS. 1A-1B
  10 line routing apparatus
  11 carrying cable (carrying strand)
  11A, 11B end region (carrying strand)
  12A, 12B hanging length portion
  12C, 12D ends (line routing apparatus)
  13 loop
  14 guide body
  M moveable machine part
  F stationary machine part
FIGS. 2A-2B
  14 guide body
  15A central part (of the guide body)
  15B outer part (of the guide body)
  16 through opening
  17 peripheral element
  18 fixing device
  19 buffer
  20A, 20B carrying arm (on the central part)
  21A, 21B clamping shell (on the central part)
  22A, 22B bar (on the central part)
  23 rotary joint (between peripheral element and carrying arm)
  24 hinge joint (on clamping shells)
  25 clamping screw
  26A, 26B hinge regions (on the central part 15A)
  27A joint head
  27B joint socket
  28 clamping tooth arrangement
  29 securing screw
  A central axis
  L receiving region
FIG. 3
  34 guide body
  15A central part (of the guide body)
  15B outer part (of the guide body)
  17 peripheral element
  19 buffer
  21A, 21B clamping shell (on the central part)
  36 mouth region (on the central part 15A)
FIG. 4 (state of the art)
  1 derrick
  2 lifting apparatus
  3 top drive
  5 lines
  6 service loop (state of the art)
FIGS. 5A-5B
  19 buffer
  25 clamping screw
  29 securing screw
  52A, 52B bar (on the central part)
  52C, 52D;52E, 52F (material thickening)
  53 rotary joint (between peripheral element and carrying arm)
  54 guide body
  57 peripheral element
FIG. 6
  60A, 60B carrying arm (on the central part)
  62 intermediate member
  63 holding eye
  64 guide body
  65A central part (of the guide body)
  65B outer part (of the guide body)
  66 through opening
  67A peripheral element (fixed)
  67B peripheral element (releasable)
  69 buffer
FIG. 7
  71 carrying cable
  72 carrying body
  75A central parts
  76A, 76B carrying arm (on the central part)
  77 receiving means
FIG. 8
  80 connecting device
  82 cable sleeve
  83 receiving means
  84 threaded projection
  85A, 85B holding arms
  86 transverse bores
FIG. 9
  90 meshed cable supporting grips
  92 loop/thimble
  93 line (cable)

What is claimed is:

1. A line routing apparatus to guide at least one line for hanging applications, comprising:
a flexible carrying strand which has tensile strength and which extends over a length of the line routing apparatus;
a plurality of guide bodies arranged in succession in a longitudinal direction of the carrying strand;
wherein adjacent guide bodies of the plurality of guide bodies are spatially deflectable relative to each other;
wherein each guide body of the plurality of guide bodies has a central part having a central axis extending coaxially relative to the carrying strand and an outer part having at least one peripheral element, wherein the at least one peripheral element outwardly delimits a receiving region open in an axial direction for the at least one line and is held to the central part;
wherein, in each guide body, the outer part is openable, wherein the at least one peripheral element is connected releasably, moveably and/or pivotably to the central part of the guide body;
wherein at least some of the guide bodies, at their central part, have a respective fixing device to fix the central part to the carrying strand; and
wherein the outer part of each guide body has two peripheral elements which are respectively connected to the central part pivotably by a joint operable for pivoting at least one of the peripheral elements into an opened position to insert the at least one line into the receiving region or remove the at least one line from the receiving region.

2. The line routing apparatus according to claim 1, wherein the central part of each guide body has an axial through opening through which the carrying strand extends; and/or
wherein the respective fixing device of the at least some of the guide bodies comprises a clamping and/or a locking device to fix the central part to the carrying strand in a force-locking relationship with an inside surface of an/the axial through opening of the central part through which the carrying strand extends.

3. The line routing apparatus according to claim 2, wherein the respective fixing device comprises at least one of:
- a clamping device in a form of a joint clamping shell having a hinge-like joint which connects two shell-shaped regions which are braceable against the carrying strand;
- a release clamp which at least partially reduces a free diameter of the axial through opening of the central part; or
- a latching clamp which at least partially reduces a free diameter of the axial through opening of the central part.

4. The line routing apparatus according to claim 1, wherein the carrying strand has carrying bodies which are fixedly mounted in the longitudinal direction of the carrying strand and to which the central part of each guide body is fixed in a positively locking relationship by the respective fixing device.

5. The line routing apparatus according to claim 1, wherein the two peripheral elements are each in a shape of a half ring and/or are each in a form of identical parts.

6. The line routing apparatus according to claim 1, wherein at least some of the guide bodies each have an elastic buffer to damp radial shock on an outside of their peripheral element.

7. The line routing apparatus according to claim 6, wherein the elastic buffer of at least one of the guide bodies comprises at least one of:
- formed of an elastomer;
- a ring shape or a toroidal configuration; or
- surrounds the at least one peripheral element.

8. The line routing apparatus according to claim 6, wherein all of the guide bodies have an elastic buffer on the outside of their peripheral element; and
wherein the elastic buffer of each guide body projects axially with respect to the at least one peripheral element and/or the buffer of each guide body is axially flush therewith so that buffers of the adjacent guide bodies limit a maximum angle of a spatial deflection of the guide bodies relative to each other as abutments.

9. The line routing apparatus according to claim 1, wherein the carrying strand has a first end and a second end; and
wherein each of the first end and the second end has a connecting device to releasably fix the line routing apparatus.

10. The line routing apparatus according to claim 9, wherein the connecting device of each of the first end and the second end has at least two oppositely disposed holding arms which provide tensile strain relief of the at least one line.

11. The line routing apparatus according to claim 1, wherein the central part of each guide body has two axially projecting mutually opposite joint regions, wherein the joint regions are of conjugate configuration, wherein one joint region of one of the guide bodies is releasably introducible in the axial direction into a conjugate joint region of another guide body of the guide bodies and wherein the joint regions form a ball joint connection for spatial deflection of the adjacent guide bodies.

12. The line routing apparatus according to claim 1, wherein the plurality of guide bodies are fixed in axially mutually spaced relationship to the carrying strand.

13. The line routing apparatus according to claim 1, wherein the central part of each guide body includes two one-piece carrying arms which respectively have an inner clamping shell and a radial bar;
wherein the inner clamping shells are connectable to form a through opening for the carrying strand; and
wherein the radial bars have an outer end region to which the outer part is connected.

14. The line routing apparatus according to claim 1, wherein the central part of each guide body has an axial through opening through which the carrying strand extends; and
wherein the central part at the through opening has a clamping tooth arrangement extending transversely relative to the central axis to axial secure to the carrying strand and/or the carrying strand is in a form of a carrying cable of plastic and/or has a length of at least 5 m.

15. The line routing apparatus according to claim 1, wherein the line routing apparatus has a first vertically downwardly hanging length portion having a first end connected to a consumer to be supplied, a second vertically downwardly hanging length portion having a second end, and a loop connecting the first and second vertically downwardly hanging length portions and the carrying strand is extended beyond both ends.

16. The line routing apparatus according to claim 1, wherein the line routing apparatus is disposed on a drilling rig.

17. The line routing apparatus according to claim 16, wherein the line routing apparatus supplies power to a vertically travelling top drive of the drilling rig and wherein the line routing apparatus comprises two vertically downwardly hanging length portions connected by a loop.

18. A guide body of a line routing apparatus to guide at least one line for hanging applications, comprising:
- a central part having a central axis and an axial through opening through which a carrying strand is passable;
- an outer part having at least one peripheral element, wherein the peripheral element outwardly delimits a receiving region open in an axial direction for the at least one line and is held to the central part;
- wherein the peripheral element is connected pivotably openable to the central part and/or provided on the central part is a fixing device to fix the central part in position to the carrying strand;
- wherein an outside of the peripheral element has an elastic buffer to damp radial shock;
- wherein the elastic buffer of at least one of the guide bodies comprises at least one of
  - formed of an elastomer,
  - a ring shape or a toroidal configuration, or
  - surrounds the at least one peripheral element; and
- wherein the elastic buffer of at least one of the guide bodies is in the form of an open ring with a gap to be opened for mounting on the outer part and to be closed by the fixing device.

19. A line routing apparatus to guide at least one line for hanging applications, comprising:
- a flexible carrying strand which has tensile strength and which extends over a length of the line routing apparatus;
- a plurality of guide bodies arranged in succession in a longitudinal direction of the carrying strand;
- wherein adjacent guide bodies of the plurality of guide bodies are spatially deflectable relative to each other;
- wherein each guide body of the plurality of guide bodies has a central part having a central axis extending coaxially relative to the carrying strand and an outer part having at least one peripheral element, wherein the peripheral element outwardly delimits a receiving region open in an axial direction for the at least one line and is held to the central part;

wherein at least some of the guide bodies have an elastic buffer to damp radial shock on an outside of their peripheral element; and wherein the central part of at least some of the guide bodies has a fixing device for fixing the central part to the carrying strand, the fixing device comprising at least one of
- a clamping device in a form of a joint clamping shell having a hinge-like joint which connects two shell-shaped regions which are braceable against the carrying strand,
- a release clamp which at least partially reduces a free diameter of the axial through opening of the central part, or
- a latching clamp which at least partially reduces a free diameter of the axial through opening of the central part.

20. The line routing apparatus according to claim 19, wherein the central part of each guide body has an axial through opening through which the carrying strand extends; and/or wherein the clamping device serves to fix the central part to the carrying strand in a force-locking relationship with an inside surface of an/the axial through opening of the central part through which the carrying strand extends.

21. The line routing apparatus according to claim 19, wherein the outer part of each guide body has two peripheral elements which are respectively connected to the central part pivotably by a joint operable for pivoting at least one of the peripheral elements into an opened position to insert the at least one line into the receiving region or remove the at least one line from the receiving region.

22. The line routing apparatus according to claim 21, wherein the two peripheral elements are each in a shape of a half ring and/or are each in a form of identical parts.

23. The line routing apparatus according to claim 19, wherein the elastic buffer of at least one of the guide bodies comprises at least one of:
- formed of an elastomer;
- a ring shape or a toroidal configuration; or
- surrounds the at least one peripheral element.

24. The line routing apparatus according to claim 23, wherein the elastic buffer of at least one of the guide bodies is in the form of an open ring with a gap to be opened for mounting on the outer part and to be closed by a fixing device.

25. The line routing apparatus according to claim 19, wherein all of the guide bodies have an elastic buffer on the outside of their peripheral element; and wherein the elastic buffers are arranged so that buffers of the adjacent guide bodies limit a maximum angle of a spatial deflection of the guide bodies relative to each other as abutments.

26. The line routing apparatus according to claim 25, wherein the elastic buffer of each guide body projects axially with respect to the at least one peripheral element and/or the elastic buffer of each guide body is axially flush therewith.

27. The line routing apparatus according to claim 19, wherein the line routing apparatus has a first vertically downwardly hanging length portion having a first end connected to a consumer to be supplied, a second vertically downwardly hanging length portion having a second end, and a loop connecting the first and second vertically downwardly hanging length portions and the carrying strand is extended beyond both ends.

28. The line routing apparatus according to claim 27, wherein the line routing apparatus is disposed on a drilling rig and supplies power to a vertically travelling top drive of the drilling rig.

* * * * *